UNITED STATES PATENT OFFICE.

CLARENCE DELAFIELD, OF FACTORYVILLE, NEW YORK.

IMPROVEMENT IN THE MANUFACTURE OF WHITE LEAD AND SALTPETER.

Specification forming part of Letters Patent No. 55,249, dated June 5, 1866.

*To all whom it may concern:*

Be it known that I, CLARENCE DELAFIELD, of Factoryville, in the county of Richmond and State of New York, have invented certain new and useful Improvements in the Manufacture of the White Lead and Saltpeter of Commerce; and I do hereby declare the following to be a full, clear, and exact description of the manner of making, using, and practicing my said invention.

The white lead of commerce, as manufactured after the old, or what is known as the "Dutch," process, consists of the carbonate of lead united with the hydrated oxide of lead in about the proportion of two chemical equivalents of the carbonate of lead to one equivalent of the hydrated oxide of lead.

The mechanical means and the chemical agencies employed in the manufacture of the white lead of commerce after the old process are familiar to every one skilled in the arts to which this invention appertains; but the formation and chemical union of the carbonate of lead and the hydrated oxide of lead which takes place in and forms a part of that process is not so well understood. It is believed, however, that the acetic acid driven off from the vinegar by the heat induced by the fermentation of the tan-bark or horse-manure against metallic lead, surrounded by an atmosphere of water-vapor and carbonic-acid gas, forms oxide of lead, and these three chemical equivalents of the oxide of lead in process of formation take from this atmosphere one equivalent of water and two equivalents of carbonic-acid gas, yielding, as the result of the chemical action, carbonate of lead in about the proportion above stated. This I understand to be the theory of the formation of the white lead of commerce by the old process. Whether this theory of the chemical action be correct or not I do not know. It is not proved; but I take it to be the received theory among chemists. However this may be, the fact remains that the white lead of commerce consists of about the chemical constituents above stated instead of the pure carbonate of lead.

Now, I have discovered that the white lead of commerce, instead of being made by the slow Dutch process, can be made very much quicker and equally as good, or better, by making, manipulating, and uniting a solution of the nitrate of lead and a solution of the carbonate of potash in such a manner as to yield a precipitate of the carbonate of lead united with the hydrated oxide of lead, which is the white lead of commerce. The manner of making, manipulating, and uniting these solutions so as to obtain the above-mentioned result I will now proceed to describe in detail. I first take from one hundred and twelve to one hundred and twenty-four parts of the nitric acid of commerce of about 36° Baumé. To this I add one hundred and twelve parts of the oxide of lead and sufficient water to make a saturated solution of the nitrate of lead, and in order to convert quickly the mixture of the nitric acid and the oxide of lead and water into a solution of the nitrate of lead I make the mixture hot. I then take about seventy parts of the purified carbonate of potash and dissolve it in its weight of water, forming a solution of the carbonate of potash and water, which I also make hot. In making the solution of the nitrate of lead I use hot water and raise the temperature of the mixture to about 200° of Fahrenheit; and in making the solution of the carbonate of potash I use boiling water, the temperature of which is lowered by mixing in the potash, and which I afterward raise to about °200 of Fahrenheit.

Having thus made and heated these solutions, I throw the hot solution of the carbonate of potash into the hot solution of the nitrate of lead, by which I at once precipitate the carbonate of lead and leave the nitrate of potash in solution, while at the same time I prevent the precipitate carbonate of lead from crystallizing, and get also a small proportion of the hydrated oxide of lead, in combination with the carbonate of lead.

The result of this process, which is substantially the same as stated in my patent of April 3, 1866, is an approximation of what is sought for, but it does not yield so large a proportion of the hydrated oxide of lead in chemical combination with the carbonate of lead as is contained in the white lead of commerce. It has not the same specific gravity as I inadvertently stated it had in my patent of the 3d of April, 1866.

Now, in throwing the hot solution of the carbonate of potash into the hot solution of the nitrate of lead, there seems to be a complete chemical union betweeen the carbonate of lead and the hydrated oxide of lead until about two-thirds of the alkaline solution has been added to the nitrate-of-lead solution, when the formation of the hydrated oxide of lead seems to stop, so that in adding the other third of the alkaline solution pure carbonate of lead is formed. It is therefore necessary to change the molecular formation of this remaining carbonate of lead by adding the necessary proportion of hydrated oxide of lead, for which purpose I introduce into the tank containing the united solutions a jet of hot steam through metallic or india-rubber pipes and continue the application until the whole solution or mass is thoroughly pervaded and heated by the steam, when it will be found that hydrated oxide of lead has been formed and united with the carbonate of lead in about the proportion above stated.

The apparatus or means of applying the steam to the solution or precipitated salts may be varied to suit the circumstances or taste of the manufacturer; but it should be applied through pipes or orifices and with sufficient force to diffuse it well through the solution or mass in case it be applied to the salt after precipitation. In what way the jet of hot steam operates upon the solution, salt, or mass to produce the change shown in the result is difficult to affirm. The beneficial effect may be owing to the increase of temperature resulting from the introduction of the steam, or it may be owing to the electricity generated by the passage of the steam through the pipes, the electricity enlarging and accelerating the chemical combination that takes place between the elements present, be they what they may. I incline to the belief, however, that the same result will be obtained by raising the temperature of the combined solutions by the application of heat thereto, whether in the form of steam or in any other suitable form. I do not, therefore, mean to confine my claims to the application of heat in the form of steam; but, whatever may be the true theory in regard to the chemical action, the fact remains that by the introduction of the steam, as above stated, I get the result sought for—that is, the white lead of commerce—quicker, whiter, and purer than can be obtained by the old or Dutch process.

In stating my improvement in the manufacture of white lead I have described my improvement in the manufacture of saltpeter also, for in the use of this process, after the salts of lead have been precipitated, I get as a residue a hot solution of the nitrate of potash, which may be drawn off, evaporated, and rapidly crystallized into a very pure saltpeter of commerce.

Having now ascertained and described the nature and extent of my improvement in the manufacture of the white lead and saltpeter of commerce, I claim as new and desire to secure by Letters Patent—

1. The application of a jet of steam to a solution of the nitrate of lead, or to a solution of the carbonate of potash, (or their equivalents for this purpose,) or to the united or combined solutions of the nitrate of lead and carbonate of potash, (or its equivalent for this purpose,) for the purpose of aiding in the production of the white lead of commerce, substantially as set forth.

2. The production of saltpeter or nitrate of potash as the residue of white lead manufactured after the process substantially as described.

3. Raising the temperature of the solutions of the nitrate of lead and the carbonate of potash after their union or combination either by the use of hot steam or by the application of other heat to aid in the production of the white lead of commerce, substantially as described.

CLARENCE DELAFIELD.

Witnesses:
 AMOS BROADNAX,
 PETER D. KENNEY.